(12) United States Patent
Alden et al.

(10) Patent No.: US 10,017,179 B2
(45) Date of Patent: Jul. 10, 2018

(54) METHOD FOR OPTIMIZING INTER-VEHICLE DISTANCE AND EQUITABLY SHARING FUEL BENEFITS IN A VEHICLE PLATOON

(71) Applicant: GM GLOBAL TECHNOLOGY OPERATIONS LLC, Detroit, MI (US)

(72) Inventors: Jeffrey M. Alden, Ypsilanti, MI (US); Andrew R. Camden, Royal Oak, MI (US); Matthew Allen Dzurka, Beverly Hills, MI (US); Soheil Samii, Royal Oak, MI (US); Chen Zhou, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/174,090

(22) Filed: Jun. 6, 2016

(65) Prior Publication Data
US 2017/0349176 A1    Dec. 7, 2017

(51) Int. Cl.
*B60W 30/16*    (2012.01)
*G08G 1/00*     (2006.01)

(52) U.S. Cl.
CPC ............. *B60W 30/16* (2013.01); *G08G 1/22* (2013.01)

(58) Field of Classification Search
CPC ................................. B60W 30/16; G08G 1/22
USPC ............................................................ 701/25
See application file for complete search history.

(56) References Cited

U.S. PATENT DOCUMENTS

| 7,898,472 | B2 | 3/2011 | Zeng | |
|---|---|---|---|---|
| 8,954,261 | B2 | 2/2015 | Das et al. | |
| 9,182,764 | B1* | 11/2015 | Kolhouse | G08G 1/017 |
| 9,665,102 | B2* | 5/2017 | Switkes | G05D 1/0293 |
| 2010/0164789 | A1 | 7/2010 | Basnayake | |
| 2010/0250132 | A1 | 9/2010 | Zeng | |
| 2010/0256836 | A1* | 10/2010 | Mudalige | G08G 1/163 |
| | | | | 701/2 |
| 2013/0041576 | A1* | 2/2013 | Switkes | G08G 1/166 |
| | | | | 701/123 |
| 2013/0151058 | A1 | 6/2013 | Zagorski et al. | |
| 2013/0231829 | A1* | 9/2013 | Gerdt | G05D 1/0061 |
| | | | | 701/41 |
| 2013/0304279 | A1 | 11/2013 | Mudalige et al. | |
| 2014/0316865 | A1* | 10/2014 | Okamoto | G08G 1/22 |
| | | | | 705/14.1 |
| 2016/0054735 | A1* | 2/2016 | Switkes | G08G 1/22 |
| | | | | 701/23 |
| 2016/0061627 | A1 | 3/2016 | Tan et al. | |
| 2017/0115666 | A1* | 4/2017 | Kolhouse | G05D 1/0293 |

* cited by examiner

*Primary Examiner* — Brian P Sweeney

(57) ABSTRACT

A method for optimizing inter-vehicle order and distance includes communicating vehicle characteristics representative of a first and at least one second vehicle as the first vehicle approaches the at least one second vehicle. Based on the vehicle characteristics, a position in a driving order of the first vehicle with respect to the at least one second vehicle is selected and executed. A real-time fuel economy is recorded as the vehicle in the trailing position moves from a maximum following distance to a minimum following distance from the vehicle in the lead position. Based on at least the recorded real-time fuel economy, an optimal inter-vehicle distance between the vehicles in the lead and trailing positions is selected and executed.

13 Claims, 4 Drawing Sheets

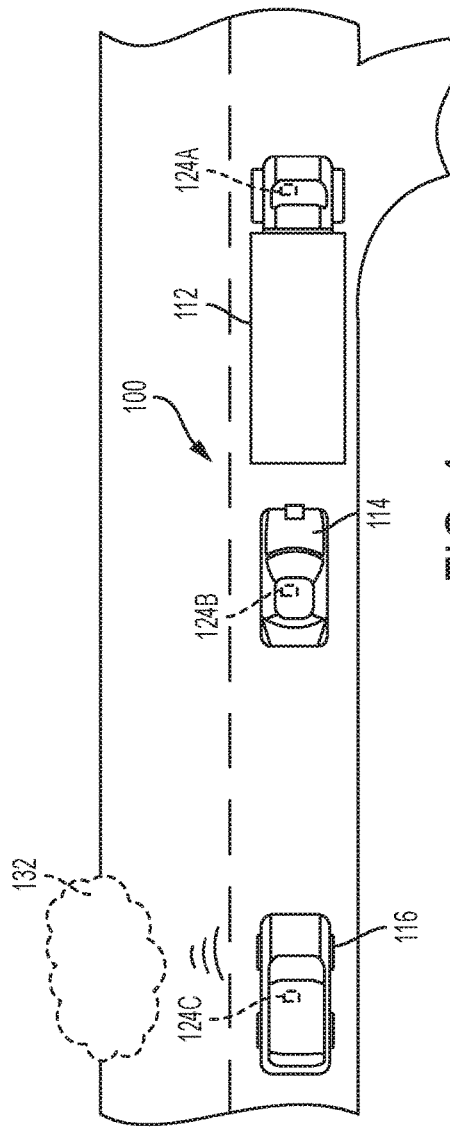
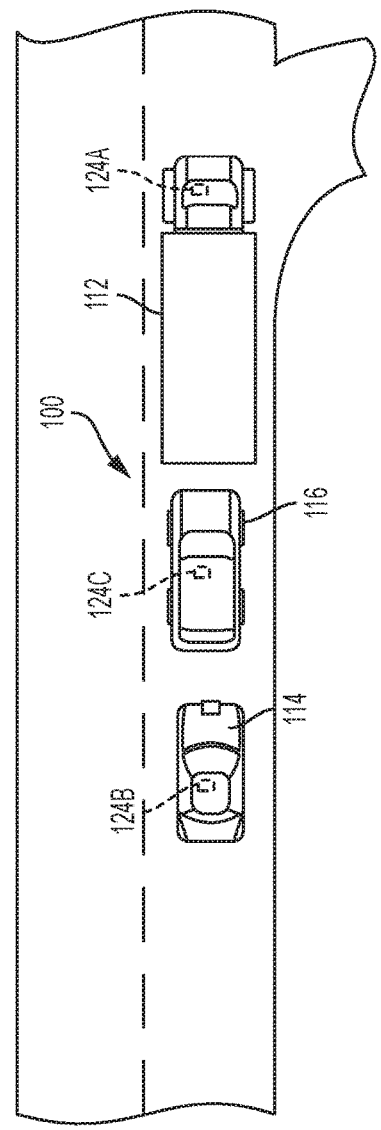

METHOD FOR OPTIMIZING INTER-VEHICLE DISTANCE AND EQUITABLY SHARING FUEL BENEFITS IN A VEHICLE PLATOON

FIELD

The present disclosure relates to vehicle platoons; and in particular, to a method for optimizing inter-vehicle distance in a platoon and equitably sharing fuel savings obtained from vehicle platooning.

Introduction

The statements in this section merely provide background information related to the present disclosure and may not constitute prior art.

Vehicular travel in high traffic areas/times requires driver attention to traffic flow, road conditions, signage, and traffic signals. Autonomous or semi-autonomous control methods, where a vehicle is equipped with devices capable of locating the vehicle with respect to the road and to other traffic on the road, are employed to augment or substitute driver control of the vehicle. Autonomous or semi-autonomous control of a vehicle can reduce operator errors and can provide a driver with time available for personal and work-related activities while en route. Autonomous or semi-autonomous control of a vehicle can also optimize vehicle maneuvering in order to provide reduced traffic congestion, reduced travel time, and improved fuel economy.

SUMMARY

A method for optimizing inter-vehicle distance includes communicating vehicle characteristics representative of a first and at least one second vehicle as the first vehicle approaches the at least one second vehicle. Based on the vehicle characteristics, a position in a driving order of the first vehicle with respect to the at least one second vehicle is selected. The first vehicle is then maneuvered into the selected position in the driving order, such that one of the first and at least one second vehicles moves into a lead position and another of the first and at least one second vehicles moves into a trailing position. A real-time fuel economy of both the vehicle in the trailing position and the vehicle in the lead position is recorded as the vehicle in the trailing position moves from a maximum following distance to a minimum following distance from the vehicle in the lead position. Based on at least the recorded real-time fuel economy, an optimal inter-vehicle distance between the vehicles in the lead and trailing positions is selected. The vehicle in the trailing position is then moved to the optimal inter-vehicle distance from the vehicle in the lead position.

A computer-implemented method for equitably sharing fuel benefits for a vehicle platoon includes detecting, via a vehicle controller, a real-time fuel economy of a vehicle before and after entering the vehicle platoon. The detected vehicle fuel economy for all vehicles in the vehicle platoon is then sent to a processor at an information exchange point. At the processor, a value of an average fractional fuel savings rate and a fractional fuel savings rate while participating in the platoon and an equitable distribution of the fuel economy improvement value for the vehicle platoon are calculated. A credit for each vehicle in the vehicle platoon is then distributed over one or more communication channels as a result of the equitable distribution.

A server has at least one processor programmed to establish communication with at least one remote system. The processor also receives a vehicle characteristic of a first and at least one second vehicle from the at least one remote system. Based on the vehicle characteristics, a driving order of the first vehicle with respect to the at least one second vehicle is selected. In response to the selected driving order, a control action is automatically executed to move the first vehicle into the selected driving order with the at least one second vehicle.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 4 is a perspective view of the vehicle platoon of FIG. 2 on a stretch of road with an additional vehicle approaching the platoon;

FIG. 5 is a perspective view of the vehicle platoon of FIG. 4 with the additional vehicle on a stretch of road;

DETAILED DESCRIPTION

Figure 1:
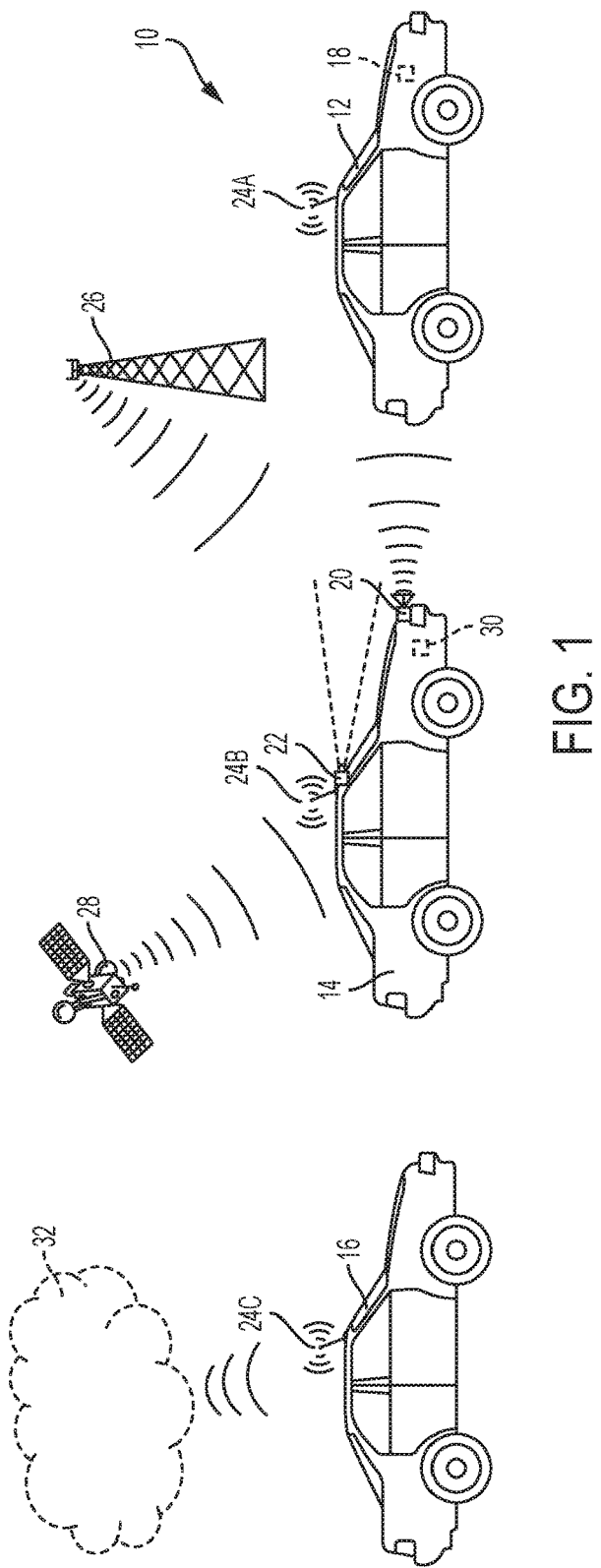
FIG. 1 is a perspective view of an exemplary vehicle platoon according to the present disclosure.

The following description is merely exemplary in nature and is not intended to limit the present disclosure, application, or uses. It should be understood that throughout the drawings, corresponding reference numerals indicate like or corresponding parts and features. Further, directions such as "top," "side," "back", "lower," and "upper" are used for purposes of explanation and are not intended to require specific orientations unless otherwise stated. These directions are merely provided as a frame of reference with respect to the examples provided, but could be altered in alternate applications.

With semi-autonomous or autonomous driving, it is possible to tightly pack vehicles together in order to benefit from reduced traffic congestion, reduced travel time, and improved fuel economy. The concept, referred to as a vehicle platoon, benefits from improved fuel economy due to the reduced aerodynamic drag obtained from maintaining a close distance to the vehicle in front. With respect to FIG. 1, an exemplary vehicle platoon 10 is depicted in traffic with a lead vehicle 12, an intermediary vehicle 14, and a trailing vehicle 16. Each of the vehicles 12, 14, 16 includes a number of devices for controlling the vehicle with respect to the environment. For example, the vehicles 12, 14, 16 may utilize vehicle sensors 18, a radar or LIDAR system 20, a camera system 22, or a vehicle-to-infrastructure (V2X) communications device 24A, 24B, 24C. The vehicles 12, 14, 16 may use the V2X communications device 24A, 24B, 24C to communicate with external sources (e.g., with V2X communications devices located on other vehicles (V2V), with a remote wireless communications system 26, and/or with a remote satellite system 28). The vehicles 12, 14, 16 each monitor and process available information from the aforementioned sources, including information on surrounding vehicles (e.g., distance, speed) and information available from the remote systems regarding the external environment (e.g., road obstructions, traffic details), at a processor at an information exchange point. The processor may be located at an on-board (e.g., controller 30) or off-board (e.g., server 32) location.

Sensor data and other information can be used in various applications to implement autonomous or semi-autonomous vehicle control for improved performance. In one example, adaptive cruise control (ACC) can be used to monitor a range to a target vehicle and control vehicle speed in order to maintain a minimum distance from the target vehicle ($D_{MIN} \neq 0$). Many forms of autonomous and semi-autonomous control are known, as such, the disclosure is not intended to be limited to the particular exemplary embodiments described herein.

Multiple sources of information can be utilized in coordination to control the approach of each vehicle as it enters a platoon. The processor at the vehicles or the server may perform simulations and measurements to quantify the relative fuel economy improvements as vehicles enter and leave the platoon either in real-time or in a predetermined (learned) manner. In one example, the processor may maintain a summary of past platoon configurations and associated fuel economy improvements for empirically providing a new platoon configuration (e.g., largest frontal area first) and minimum/maximum inter-vehicle spacing. As a prerequisite, measurements or models need to consider various platoon sizes, vehicle types, orderings, and inter-vehicle distances. Notably, the fuel economy improvement is not necessarily a decreasing function of the inter-vehicle spacing distance; the function has multiple local optimal points. Furthermore, the function depends on the type and size of vehicles in the platoon and their locations with respect to one another.

Figure 2:
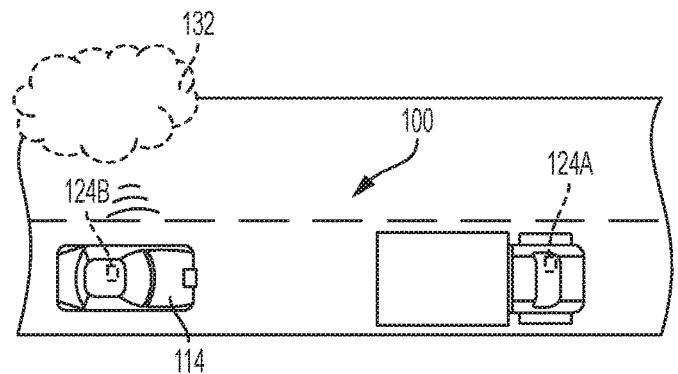
FIG. 2 is a perspective view of a vehicle platoon on a stretch of road.

With reference now to FIG. 2, a first trailing vehicle 114 approaches a lead vehicle 112 at a maximum following distance. In one example, the first trailing vehicle 114 can monitor instantaneous fuel economy as it approaches the lead vehicle 112 in order to determine optimal trailing spacing behind lead vehicle 112 (i.e., no external communication occurring). In another example, the first trailing vehicle 114 may communicate through a V2X communications device 124B either directly with a V2X communications device 124A of the lead vehicle 112 or through a server 132 (e.g., ONSTAR) in order to perform an optimization process to determine driving order and/or proper inter-vehicle spacing. Lead vehicle 112 may be a semi-trailer truck having a large frontal area (e.g., large drag coefficient), while first trailing vehicle 114 can be a mid-size car having a substantially smaller frontal area (e.g., small drag coefficient). Lead vehicle 112 and first trailing vehicle 114 communicate their respective vehicle characteristics and determine that an appropriate position for first trailing vehicle 114 with respect to lead vehicle 112 is as a follower vehicle. Lead vehicle 112 and first trailing vehicle 114 then capture real-time fuel economy (i.e., MPG), while first trailing vehicle 114 continues to move towards a minimum following distance.

Figure 3:
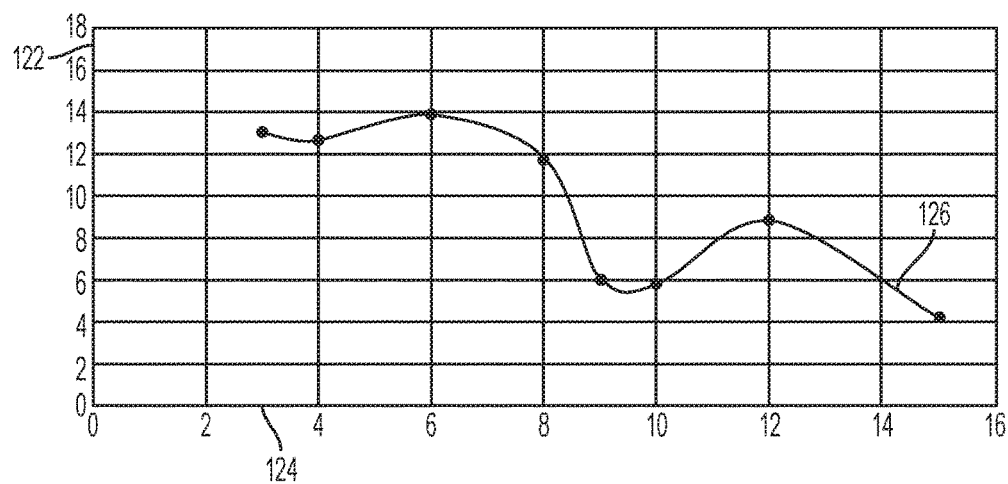
FIG. 3 is a graphical representation of fuel savings as a function of following distance for a trailing vehicle in the vehicle platoon of FIG. 2.

With reference to FIG. 3, an exemplary data collection plot is disclosed, which represents the percent fuel savings (e.g., y-axis 122) of first trailing vehicle 114 as a function of following distance (i.e., meters) from lead vehicle 112 (e.g., x-axis 124). In particular, data series 126 represents the fuel benefit received by first trailing vehicle 114 as it approaches lead vehicle 112. An optimal following distance, which provides the best fuel economy for the vehicle, is determined from the gathered data survey (e.g., following distance of 6 m). The optimal following distance is then used by the first trailing vehicle 114 in either an autonomous (e.g., through a control function) or semi-autonomous (e.g., through a driver prompt) fashion so that the first trailing vehicle 114 can be moved to the most economical position with respect to the lead vehicle 112 to form a vehicle platoon 100.

Referring now to FIG. 4, a second trailing vehicle 116 approaches the vehicle platoon 100. The second trailing vehicle 116 may communicate through a V2X communications device 124C either directly with the V2X communications devices 124A, 124B of the lead and/or first trailing vehicles 112, 114 or through the server 132 in order to perform an optimization process to determine driving order and proper inter-vehicle spacing. In one example, second trailing vehicle 116 is a passenger van having a median frontal area (e.g., median drag coefficient) as compared to lead vehicle 112 and first trailing vehicle 114. Lead vehicle 112, first trailing vehicle 114, and second trailing vehicle 116 may communicate their respective vehicle characteristics and determine that an appropriate position for the second trailing vehicle 114 is interposed between lead vehicle 112 and first trailing vehicle 114. First trailing vehicle 114 is advised to provide spacing for second trailing vehicle 116 to move into position forward of first trailing vehicle 114. The spacing provided is large enough for second trailing vehicle 116 to easily move into position and to provide real-time data for an optimal following distance. It is contemplated that various vehicle positioning arrangements may be predetermined based on, for example, recorded vehicle frontal areas, such that appropriate spacing can be immediately conveyed to the platoon 100. It is also contemplated that empirical determination of optimal vehicle spacing may be completed as the platoon 100 changes, such that a recorded history of prior platoons having similar characteristics dictates the appropriate vehicle spacing.

With reference to FIG. 5, the second trailing vehicle 116 moves into the median position between lead vehicle 112 and first trailing vehicle 114. Each vehicle 112, 114, 116 then captures real time fuel economy (i.e., MPG), while second trailing vehicle 114 moves to an optimal following distance behind lead vehicle 112. Likewise, first trailing vehicle 114 performs the same data collection with respect to its position behind second trailing vehicle 116. Optimal following distances, which provide the best fuel economy for the vehicle combination, are determined from the gathered data survey. The optimal following distances are then relayed to the first and second trailing vehicles 114, 116 in either an autonomous (e.g., through a control function) or semi-autonomous (e.g., through a driver prompt) fashion so that the first and second trailing vehicles 114, 116 can be moved to the most economical position with respect to the second trailing vehicle 116 and lead vehicle 112, respectively. It should be noted that the optimal following distances may be adjusted for different driving conditions. In one example, optimal efficiencies may occur at distances of 2 meters and 5 meters; however, selecting the greater distance may be preferable at certain speeds or with higher traffic in order to increase vehicle separation to allow for stopping distance variation.

The above-described process will be reinitiated as any new vehicle joins the platoon 100. In other words, when a vehicle joins an existing platoon, a re-optimization process is initiated to: (1) allow sufficient space for the new vehicle to enter the platoon; and (2) select new inter-vehicle distances by considering the multiple locally optimal distances. It is noted that the entry of the new vehicle in the platoon will result in a non-optimal fuel economy for the entire platoon. As such, it is advantageous to re-establish optimal operation of the platoon each time a vehicle enters or leaves the platoon. Although the primary application of the invention is to vehicle platoons involving large numbers of vehicles, it should be understood that the aforementioned optimization process can be used by an individual vehicle to find its optimal placement relative to any leading vehicle. When the leading vehicle changes lane or exits the highway, the trailing vehicle can identify a new leading vehicle and re-calculate its position based on the type, size, and aerodynamic properties of the new lead vehicle.

The benefit from driving in a platoon is not equally distributed between a lead vehicle and any trailing vehicles and is typically different for each vehicle in the platoon. A given platoon formation is the optimal packing order that generates the highest savings for the platoon, as a whole. As such, it is necessary to incentivize and encourage a driver to move to the lead vehicle position for the benefit of the entire platoon. The implementation of a fair value distribution system provides all drivers with a financial incentive to join a platoon and adjust vehicle positions in order to achieve the maximum fuel savings for the group. Accordingly, a process that fairly distributes fuel savings among vehicles participating in a platoon is provided herein. An equitable benefit distribution (e.g., a fuel economy value increase equal to the overall percentage of fuel economy improvement of the platoon) can be obtained from the following equations:

Equation (1) provides the average fractional fuel savings rate (per km driven) of a platoon consisting of n vehicles:

$$\bar{r} = \frac{\sum_{i=1}^{n}(f_i - f_i')p_i}{\sum_{i=1}^{n} f_i} \tag{1}$$

Where,
i=vehicle
$f_i$=Fuel economy of vehicle i driving alone (L/100 km)
$f_i'$=Fuel economy of vehicle i in platoon ($f_i' \leq f_i$; L/100 km)
$p_i$=fuel price for vehicle i ($/L)

Equation (2) provides the vehicle's fractional fuel savings rate while participating in the platoon:

$$r_i = \frac{(f_i - f_i')p_i}{f_i} \tag{2}$$

Equation (3) provides a fractional savings rate for each vehicle (e.g., each vehicle's savings rate less the average platoon savings rate):

$$c_i = (r_i - \bar{r}) \tag{3}$$

Equation (4) provides the accumulated cost (positive) or payment (negative) for each vehicle i after the platoon travels a distance d:

$$s_i(d) = c_i d \tag{4}$$

Where,
d=trip distance while a stable platoon (km)

Equation (5) provides the net value v for each vehicle after traveling distance d:

$$v(d) = \bar{r}d = \frac{\sum_{i=1}^{n}(f_i - f_i')p_i}{\sum_{i=1}^{n} f_i} d \tag{5}$$

The net value can then be communicated to a processor at an information exchange point, such as a secured data center (e.g., an external server), to distribute the credits appropriately between the vehicles in the platoon.

Figure 6:
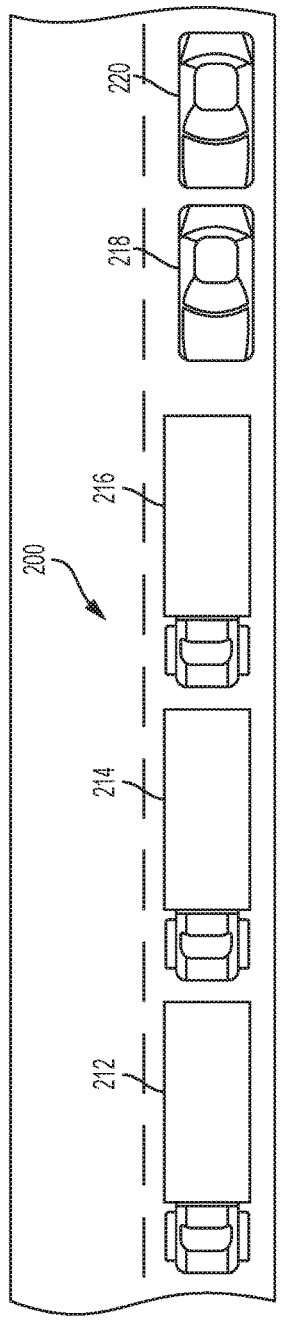
FIG. 6 is a perspective view of another vehicle platoon on a stretch of road.

With reference now to FIG. 6, an exemplary vehicle platoon 200 including three large vehicles (e.g., semi-trailer trucks 212, 214, 216) and two small vehicles (e.g., sedans 218, 220) is shown. As the vehicles 212, 214, 216, 218, 220 enter into the platoon 200, each vehicle communicates its respective vehicle characteristics in order to determine an appropriate position within the platoon 200. After moving into the optimal vehicle order, an optimum following distance for each vehicle is ascertained as described above.

Figure 7:
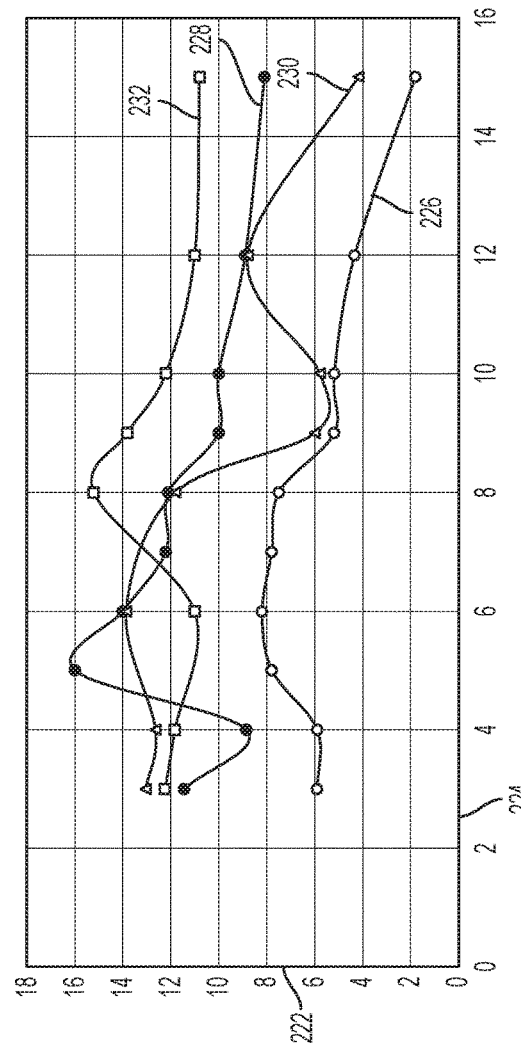
FIG. 7 is a graphical representation of fuel savings as a function of following distance for the vehicle platoon of FIG. 6.

An exemplary data collection plot is depicted in FIG. 7, which represents the percent fuel savings (e.g., y-axis 222) of each vehicle as a function of following distance (i.e., meters) (e.g., x-axis 224). In particular, data series 226 represents the fuel benefit received by truck 212 as it is approached by truck 214 (e.g., truck-to-truck), data series 228 represents truck 214 and truck 216 as they approach truck 212 and truck 214, respectively (e.g., truck-to-truck), data series 230 represents sedan 218 as it approaches truck 216 (e.g., car-to-truck), and data series 232 represents sedan 220 as it approaches sedan 218 (e.g., car-to-car). Data series 226 depicts the fuel savings realized due to the increased air pressure behind the lead truck 212, which reduces the drag on the vehicle (i.e., the lead car experiences a fuel benefit from drafting, albeit a minimal benefit). The data collection plot is a simplified example of fuel benefit received due to following distance alone (i.e., truck 214 and 216 are depicted as having the same fuel economy). However, various factors may affect fuel economy of the vehicles in the platoon (e.g., individual vehicle maintenance, aerodynamic features located on vehicle exterior, vehicle weight). These factors are mitigated with real-time vehicle data collection.

The truck 212 assists primarily in creating the drafting effect, but does not realize the same fuel savings compared to the trucks 214, 216 and sedans 218, 220. To compensate for the lagging fuel economy of the truck 212, the trailing vehicles 214, 216, 218, 220 each must contribute to the fuel savings for the truck 212 during platoon travel, so that all drivers may enjoy the same net gain percentage of fuel economy improvement. In order to further illustrate this exemplary embodiment, it is assumed that the platoon 200 travels together for 100 km (d) with a fuel price of $1/L (p). Furthermore, exemplary fuel economy values for the vehicles before and after entering the platoon 200 are:
truck (212): $f_1$=50 L/100 km; $f_1'$=47 L/100 km
truck (214): $f_2$=50 L/100 km; $f_2'$=44.3 L/100 km
truck (216): $f_3$=50 L/100 km; $f_3'$=44.3 L/100 km
sedan (218): $f_4$=10 L/100 km; $f_4'$=8.61 L/100 km
sedan (220): $f_5$=10 L/100 km; $f_5'$=8.48 L/100 km Using the aforementioned calculations, a processor at an information exchange point (e.g., locally at vehicles 214, 216, 218, 220 or remotely at an external server) computes a compensation amount for lead truck 212 for lagging fuel economy due to driving order, as shown in Table 1 below. In particular, truck 214 and truck 216 each contribute $0.61, sedan 218 contributes $0.37, and sedan 220 contributes $0.50, such that each truck 212, 214, 216 receives a net gain of $5.09 and each sedan 218, 220 receives a net gain of $1.02 for the time spent as a platoon 200. As can be seen, a negative credit results in a receipt of funds from other platoon vehicles, while a positive credit relates to an amount paid towards other vehicles in the platoon. In this way, all vehicles receive the same net gain equivalent of a 10.2% fuel economy improvement.

TABLE 1

Vehicle fuel economy improvement values from platooning

| Vehicle | Avg. Fuel Improvement (Platoon) | Avg. Fuel Improvement (Individual) | Credit | Individual Savings | Net gain |
| --- | --- | --- | --- | --- | --- |
| Truck (212) | 10.2% | 6% | ($2.09) | $3.00 | $5.09 |
| Truck (214) | 10.2% | 11.4% | $0.61 | $5.70 | $5.09 |
| Truck (216) | 10.2% | 11.4% | $0.61 | $5.70 | $5.09 |
| Sedan (218) | 10.2% | 13.9% | $0.37 | $1.39 | $1.02 |
| Sedan (220) | 10.2% | 15.2% | $0.50 | $1.52 | $1.02 |

It is also contemplated that a user interface (e.g., smartphone application) can be utilized in order to provide participation or departure requests from the platoon. The user interface can communicate with a processor at an information exchange point to calculate the best vehicle route, the initial vehicle packing order, and any formation and/or exit maneuvers, which can then be sent as commands to platooning vehicles. The vehicles can dynamically adjust following distances to maximize fuel savings for the platoon, as a whole. Real-time vehicle information (e.g., MPG, mileage, temperature, wind speed) is sent to the processor at the information exchange point for calculating the credit to be provided to each vehicle for time spent in the platoon. The credit distribution system can present a trip summary to the driver detailing the net savings gained through platooning.

Embodiments of the present disclosure are described herein. This description is merely exemplary in nature and, thus, variations that do not depart from the gist of the disclosure are intended to be within the scope of the disclosure. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for various applications. Various combinations and modifications of the features consistent with the teachings of this disclosure, however, could be desired for particular applications or implementations.

What is claimed is:

1. A method for optimizing inter-vehicle distance, comprising:
    communicating at least one of a frontal area and a drag coefficient representative of a first and at least one second vehicle to a processor at an information exchange point, as the first vehicle approaches the at least one second vehicle;
    selecting, based on the at least one of the frontal area and the drag coefficient, a position in a driving order of the first vehicle with respect to the at least one second vehicle;
    transmitting the position in the driving order from the processor to at least one of the first vehicle and the second vehicle;
    maneuvering the first vehicle into the selected position in the driving order, wherein one of the first and at least one second vehicles moves into a lead position and another of the first and at least one second vehicles moves into a trailing position;
    recording a real-time fuel economy of both the vehicle in the trailing position and the vehicle in the lead position in the processor, as the vehicle in the trailing position moves from a maximum following distance to a minimum following distance from the vehicle in the lead position;
    selecting, based on at least the recorded real-time fuel economy, an optimal inter-vehicle distance between the vehicles in the lead and trailing positions; and
    moving the vehicle in the trailing position to the optimal inter-vehicle distance from the vehicle in the lead position.

2. The method for optimizing inter-vehicle distance of claim 1, wherein the at least one second vehicle is a platoon of two or more vehicles.

3. The method for optimizing inter-vehicle distance of claim 2, wherein maneuvering the first vehicle into the selected position further comprises:
    providing a space for the first vehicle to enter the platoon in a central position within the platoon.

4. The method for optimizing inter-vehicle distance of claim 2, further comprising:
    re-establishing optimal inter-vehicle distances between each vehicle in the platoon when a vehicle enters or leaves the platoon.

5. The method for optimizing inter-vehicle distance of claim 1, wherein the processor provides a command for maneuvering the first vehicle into the selected position in the driving order.

6. The method for optimizing inter-vehicle distance of claim 1, wherein all steps are autonomously performed by the vehicles.

7. The method for optimizing inter-vehicle distance of claim 1, wherein prior to the step of communicating, the method further comprises:
    approaching the at least one second vehicle on a stretch of road; and
    indicating, via a communications device, a desire to enter into a vehicle platoon with the at least one second vehicle.

8. The method for optimizing inter-vehicle distance of claim 7, wherein the communications device indicates the driving order and the optimal inter-vehicle distance, and wherein the steps of maneuvering the first vehicle into the selected position and moving the vehicle into the trailing position are performed semi-autonomously.

9. A server comprising:
    at least one processor programmed to:
        establish communication with at least one of a remote wireless communications system and a remote satellite system;

receive a vehicle characteristic of a first and at least one second vehicle from the at least one remote wireless communications system and remote satellite system, wherein the vehicle characteristic is at least one of a vehicle frontal area and a vehicle drag coefficient;

select, based on the vehicle characteristics, a driving order of the first vehicle with respect to the at least one second vehicle; and in response to the selected driving order, send a control action to the first vehicle, which in turn, moves into the selected driving order with the at least one second vehicle.

10. The server of claim 9, wherein one of the first and at least one second vehicles is moved into a lead position and another of the first and at least one second vehicles is moved into a trailing position; and wherein the at least one processor further receives a value representative of a real-time fuel economy of the vehicle in the trailing position and the vehicle in the lead position as the vehicle in the trailing position moves from a maximum following distance to a minimum following distance from the vehicle in the lead position.

11. The server of claim 10, wherein the at least one processor is further programmed to:

select, based on the received real-time fuel economy values, an optimal inter-vehicle distance between the vehicles in the lead and trailing positions; and in response to the selected optimal inter-vehicle distance, automatically execute a control action to move the vehicle in the trailing position to the optimal inter-vehicle distance from the vehicle in the lead position.

12. The server of claim 9, wherein the at least one processor is further programmed to:

receive a value indicative of a real-time fuel economy of the first and the at least one second vehicle before and after moving into the selected driving order;

calculate an individual fuel economy value and an average combined fuel economy improvement value of the first and the at least one second vehicle as a result of moving into the selected driving order;

calculate an equitable distribution of the fuel economy improvement value for the first and the at least one second vehicle; and distribute a credit to the first and the at least one second vehicle over one or more communication channels as a result of the equitable distribution.

13. The server of claim 9, wherein the at least one second vehicle is a platoon of two or more vehicles.

* * * * *